(12) United States Patent  
Kim et al.

(10) Patent No.: US 10,901,271 B2  
(45) Date of Patent: Jan. 26, 2021

(54) LIQUID-CRYSTAL DISPLAY DEVICE HAVING PAIRED SUB-PIXEL ELECTRODES

(71) Applicant: SAMSUNG DISPLAY CO., LTD., Yongin-si (KR)

(72) Inventors: Kang Hyun Kim, Seoul (KR); Hoi Sik Moon, Asan-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 16/288,206

(22) Filed: Feb. 28, 2019

(65) Prior Publication Data

US 2019/0196276 A1 Jun. 27, 2019

Related U.S. Application Data

(62) Division of application No. 15/457,240, filed on Mar. 13, 2017, now Pat. No. 10,254,596.

(30) Foreign Application Priority Data

Mar. 14, 2016 (KR) .................. 10-2016-0030294

(51) Int. Cl.
*G02F 1/1343* (2006.01)
*G02F 1/1335* (2006.01)
*G02F 1/1362* (2006.01)
*G02F 1/1368* (2006.01)

(52) U.S. Cl.
CPC ...... *G02F 1/134309* (2013.01); *G02F 1/1368* (2013.01); *G02F 1/13624* (2013.01); *G02F 1/133514* (2013.01); *G02F 1/136286* (2013.01); *G02F 2201/123* (2013.01); *G02F 2201/52* (2013.01)

(58) Field of Classification Search
CPC .................................. G02F 1/1337

IPC .................. G02F 1/133514,1/134309
See application file for complete search history.

(56) References Cited

U.S. PATENT DOCUMENTS

| | | | |
|---|---|---|---|
| 2012/0154727 A1* | 6/2012 | Chang | G02F 1/133707 349/129 |
| 2014/0063428 A1* | 3/2014 | Lee | G02F 1/13439 349/139 |
| 2015/0166789 A1 | 6/2015 | Kwon et al. | |
| 2015/0168789 A1* | 6/2015 | Kwon | G02F 1/134336 349/33 |
| 2015/0228237 A1* | 8/2015 | Wu | G09G 3/3648 345/87 |

(Continued)

*Primary Examiner* — Sang V Nguyen

(74) *Attorney, Agent, or Firm* — F. Chau & Associates, LLC

(57) ABSTRACT

A liquid-crystal display device includes a first substrate, a plurality of pixel units disposed on the first substrate, a color filter layer overlapping the plurality of pixel units and including first to third color filters, a second substrate facing the first substrate, and a liquid-crystal layer interposed between the first substrate and the second substrate. Each of the pixel units of the plurality of the pixel units includes a first pixel, a second pixel and a third pixel. The first pixel includes a first pixel electrode, the second pixel includes a second pixel electrode, and the third pixel includes a first sub-pixel electrode and a second sub-pixel electrode. A voltage applied to the first sub-pixel electrode is different from a voltage applied to the second sub-pixel electrode.

7 Claims, 11 Drawing Sheets

(56) References Cited

U.S. PATENT DOCUMENTS

| | | | |
|---|---|---|---|
| 2016/0178963 A1* | 6/2016 | Itou | H01L 27/1218 257/72 |
| 2016/0342058 A1* | 11/2016 | Park | G02F 1/136286 |
| 2017/0261819 A1 | 9/2017 | Kim et al. | |

* cited by examiner

LIQUID-CRYSTAL DISPLAY DEVICE HAVING PAIRED SUB-PIXEL ELECTRODES

This application is a divisional of U.S. patent application Ser. No. 15/457,240 filed on Mar. 13, 2017, which claims priority under 35 USC § 119 to Korean Patent Application No. 10-2016-00302.94 filed on Mar. 14, 2016 in the Korean Intellectual Property Office, the disclosures of which are incorporated by reference herein in their entireties.

TECHNICAL FIELD

The present disclosure relates to a liquid-crystal display (LCD) device and, more particularly, to a liquid-crystal display (LCD) device capable of improving visibility without reducing transmittance.

DISCUSSION OF THE RELATED ART

A liquid-crystal display (LCD) device is a commonly used type of flat panel display device. An LCD device may include two substrates on which field generating electrodes such as a pixel electrode and a common electrode may be disposed, and a liquid-crystal layer. The liquid-crystal layer may be disposed between the pixel electrode and the common electrode. An LCD device displays an image by applying a voltage to the field generating electrodes to generate an electric field across the liquid-crystal layer. Further, liquid-crystal molecules in the liquid-crystal layer are aligned by the electric field so as to control polarization of incident light.

Among other alignment modes, a vertically aligned (VA) mode in an LCD is under development. A VA mode LCD orients the liquid crystal molecules such that their major axes are perpendicular to the upper and lower substrates when no electric field is applied.

In such a VA mode of an LCD device, a plurality of domains with different orientations of liquid crystals may be formed in a pixel to achieve wide viewing angle.

To form such a plurality of domains, cut portions such as fine slits may be formed in the field generating electrodes or protrusions may be formed on the field generating electrodes.

SUMMARY

Aspects of the present inventive concept provide an LCD device that may improve visibility without reducing transmittance.

According to an exemplary embodiment of the present inventive concept, a liquid-crystal display (LCD) device includes a first substrate, a plurality of pixel units disposed on the first substrate, a color filter layer overlapping the plurality of pixel units and including first to third color filters. The LCD device further includes a second substrate facing the first substrate, and a liquid-crystal layer interposed between the first substrate and the second substrate. Each of the pixel units of the plurality of the pixel units includes a first pixel, a second pixel and a third pixel. The first pixel includes a first pixel electrode, the second pixel includes a second pixel electrode, and the third pixel includes a first sub-pixel electrode and a second sub-pixel electrode. The first color filter overlaps the first pixel electrode, the second color filter overlaps the second pixel electrode, and the third color filter overlaps each of the first sub-pixel electrode and the second sub-pixel electrode. A voltage applied to the first sub-pixel electrode is different from a voltage applied to the second sub-pixel electrode. Each of the first pixel, the second pixel and the third pixel has substantially a same area.

According to an exemplary embodiment of the present inventive concept, a liquid-crystal display (LCD) device includes a first substrate, a plurality of pixel units disposed on the first substrate, a color filter layer overlapping the plurality of pixel units and including first to third color filters. The LCD device further includes a second substrate facing the first substrate, and a liquid-crystal layer interposed between the first substrate and the second substrate. Each of the pixel units of the plurality of the pixel units includes first to fourth pixels. The first pixel includes a first pixel electrode, the second pixel includes a second pixel electrode, the third pixel includes a third pixel electrode, and the fourth pixel includes a fourth pixel electrode. The first color filter overlaps the first pixel electrode, the second color filter overlaps the second pixel electrode, and the third color filter overlaps both of the third and fourth pixel electrodes. A voltage applied to the third pixel electrode is different from a voltage applied to the fourth pixel electrode. In each of the pixel units, an area occupied by the first pixel, an area occupied by the second pixel, a sum of an area occupied by the third pixel, and an area occupied by the fourth pixel are all substantially equal to one another.

According to an exemplary embodiment of the present inventive concept, a liquid-crystal display (LCD) device includes a first substrate, a plurality of pixel units disposed on the first substrate, a second substrate facing the first substrate, a liquid-crystal layer interposed between the first substrate and the second substrate, and a blue color filter. Each of the pixel units of the plurality of the pixel units includes first to fourth pixels. The first pixel includes a first pixel electrode, the second pixel includes a second pixel electrode, the third pixel includes a third pixel electrode, and the fourth pixel includes a fourth pixel electrode. The blue color filter overlaps both the third and fourth pixel electrodes. A voltage applied to the third pixel electrode is different from a voltage applied to the fourth pixel electrode.

BRIEF DESCRIPTION OF THE DRAWINGS

The above and other aspects and features of the present inventive concept will become more apparent by describing in detail exemplary embodiments thereof with reference to the accompanying drawings, in which.

DETAILED DESCRIPTION OF THE EMBODIMENTS

Exemplary embodiments of the present invention will be described in more detail below with reference to the accompanying drawings, in which exemplary embodiments of the preset invention are shown. The same reference numbers may indicate the same components throughout the specification. In the accompanying figures, the thickness of layers and regions may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

In the present inventive concept, an electronic apparatus may be any apparatus provided with a display device. Examples of the electronic apparatus may include smartphones, mobile phones, navigators guidance device, game console, televisions, car head units, notebook computers, laptop computers, tablet computers, personal media players (PMPs), personal digital assistants (PDAs), etc. The electronic apparatus may be embodied as a pocket-sized portable communication terminal having a wireless communication function. Further, the display device may be a flexible display device capable of bending or folding.

Hereinafter, exemplary embodiments of the present inventive concept will be described with reference to the accompanying drawings.

Figure 1:
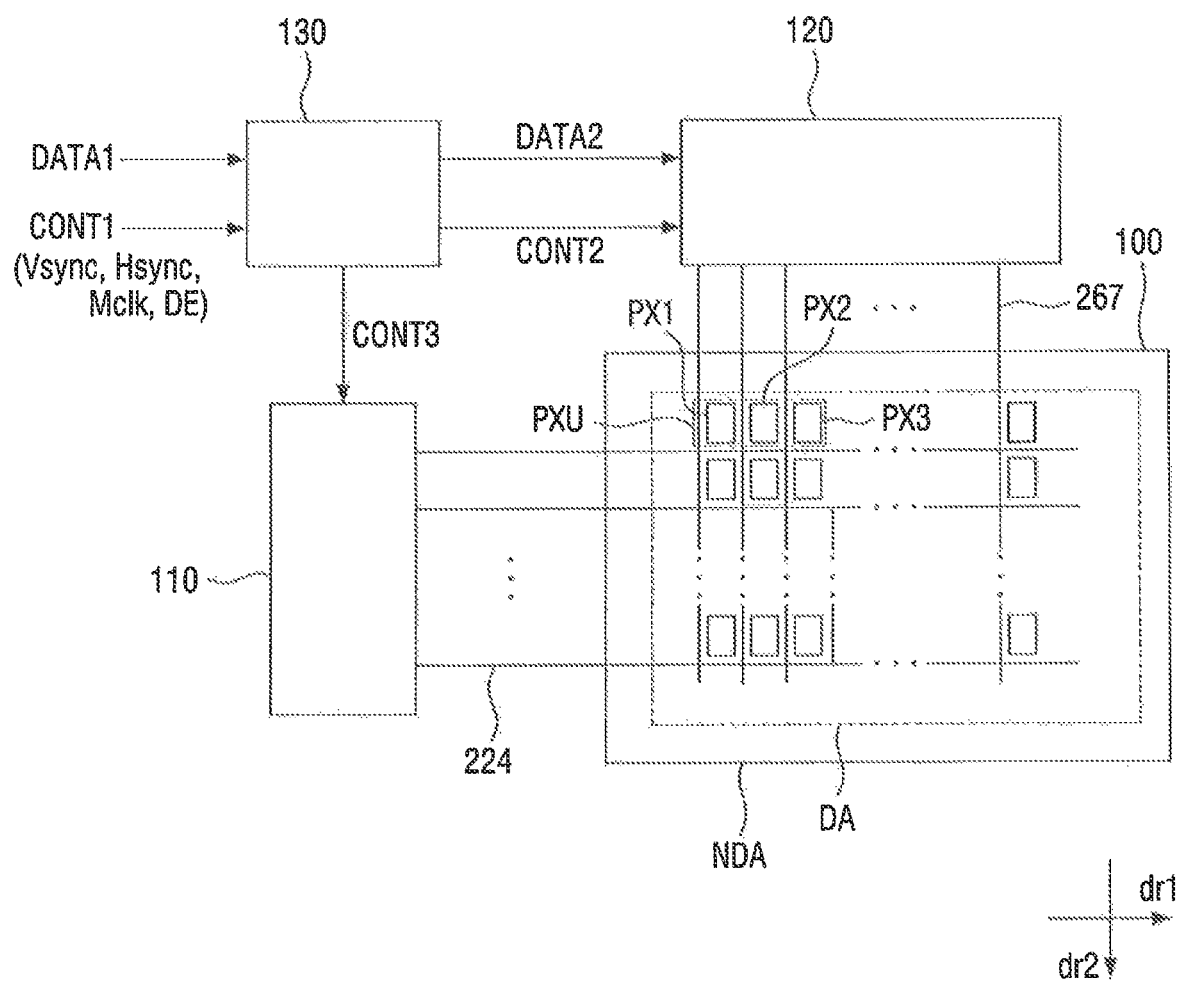
FIG. 1 is a block diagram of a liquid-crystal display (LCD) device according to an exemplary embodiment of the present inventive concept.

FIG. 1 is a block diagram of a liquid-crystal display (LCD) device according to an exemplary embodiment of the present inventive concept.

Referring to FIG. 1, the LCD device according to an exemplary embodiment of the present inventive concept may include a display panel 100, a gate driver 110, a data driver 120 and a signal controller 130.

The display panel 100 includes a display area DA where a plurality of pixel units PXUs is disposed, and a non-display area NDA that may be outside of the display area DA.

The display area DA includes the plurality of pixel units PXUs arranged in a matrix. Each of the pixel units PXUs may be a minimum unit for reproducing an arbitrary color and each pixel unit PXU may include a plurality of pixels PXs. A color reproduced by a pixel unit PXU may be determined by a combination of colors of a plurality of pixels PXs included in the pixel unit PXU. For example, of the pixel units PXUs may include three pixels PXs. The three pixels may include a pixel PX for producing red color, a pixel PX for producing green color, and a pixel PX for producing blue color. A pixel PX may represent a color determined by a color of a color filter layer to be described below, and the pixel unit PXU may be the minimum unit for controlling grayscale.

The non-display area NDA may surround the outer periphery of the display area DA. Further, elements for driving the pixels PXs may be disposed in the non-display area NDA. Examples of the elements for driving the pixels PXs in the display area DA may include the gate driver 110, the data driver 120 and the signal controller 130.

The display panel 100 may include a plurality of gate lines 224 extending in a first direction D1 (e.g., an x-axis direction), and a plurality of data lines 267 extending in a second direction D2 (e.g., a y-axis direction). The first direction D1 crosses the second direction D2.

The gate lines 224 may receive gate signals from the gate driver 110, and the data lines 267 may receive data signals from the date driver 120. Each of the pixels PXs may be connected to the gate lines 224 and the data lines 267 to receive the gate signals and the data signals.

The signal controller 130 may receive a variety of signals from external sources and may control the gate driver 110 and the data driver 120. The signal controller 130 may receive first image data DATA1 and an input control signals CONT1 for controlling how to display the first image data DATA1. Further, the signal controller 130 may output a gate driver control signal CONT3, a data driver control signal CONT2, second image data DATA2, etc.

The first image data DATA1 may contain brightness information for each of the pixels PXs. The brightness information may have a predetermined number of gray levels, for example, 1,024 ($=2^{10}$), 256 ($=2^8$) or 64 ($=2^6$) gray levels. The received first image data DATA1 may be divided frame by frame.

The input control signal CONT1 delivered to the signal controller 130 may include, for example, a vertical synchronous signal Vsync, a horizontal synchronous signal Hsyne, a main clock signal Mclk and a data enable signal DE. However, exemplary embodiments of the present inventive concept are not limited thereto. For example, other types of signals may further be inputted to the signal controller 130.

The gate driver control signal CONT3 may control the operation of the gate driver 110 and may be generated in the signal controller 130. The signal controller 130 may provide the gate driver control signal CONT3 to the gate driver 110. The gate driver control signal CONT3 may include, but is not limited to, a scan start signal, a clock signal, etc. The gate driver 110 may generate the gate signals for activating the pixels PXs in response to the gate driver control signal CONT3 and may provide each of the gate signals to the respective gate lines 224 of the pixels PXs.

The data driver control signal CONT2 may control the operation of the data driver 120 and may be generated in the signal controller 130. The signal controller 130 may provide the data driver control signal CONT2 to the data driver 120. The data driver 120 may generate the data signals in response to the data driver control signal CONT2 and may provide each of the data signals to the respective data lines 267 of the pixels PXs.

Hereinafter, a structure of a pixel unit PXU will be described with reference to FIGS. 2 and 3.

Figure 2:
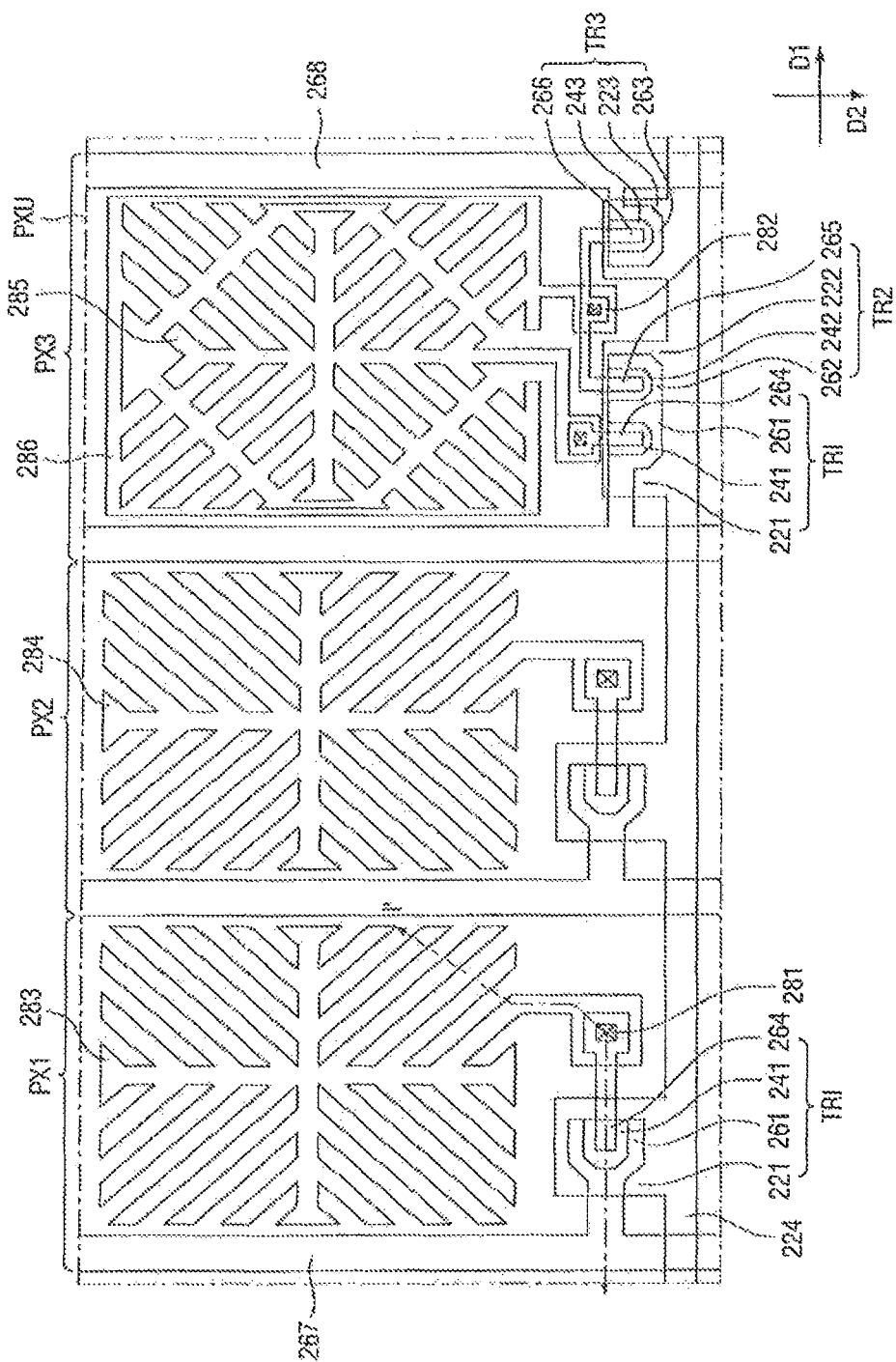
FIG. 2 is a layout diagram of a single pixel disposed in a display panel according to an exemplary embodiment of the present inventive concept.

FIG. 2 is a layout diagram of a single pixel disposed in a display panel according to an exemplary embodiment of the present inventive concept. FIG. 3 is a cross-sectional view taken along line I-I' of FIG. 2.

Figure 3:
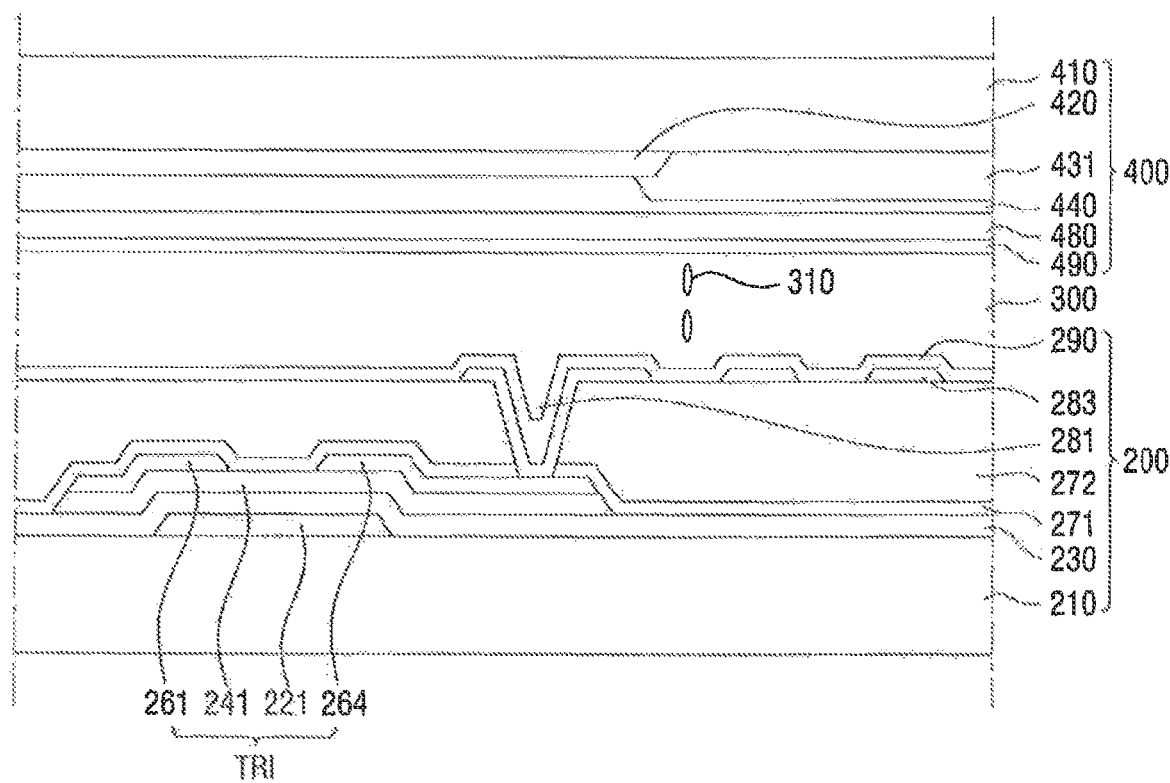
FIG. 3 is a cross-sectional view taken along line I-I' of FIG. 2.

Referring to FIGS. 2 to 3, a display panel 100 according to an exemplary embodiment of the present inventive concept may include an array substrate 200, an opposing substrate 400 and a liquid-crystal layer 300.

On the array substrate 200, first to third thin-film transistors TR1, TR2 and TR3 are disposed. The first to third thin-film transistors TR1, TR2 and TR3 work as switching elements for applying the data voltage to a pixel PX. The opposing substrate 400 is disposed such that it faces the array substrate 200. For example, the opposing substrate 400 may be disposed above or below the array substrate 200. The liquid-crystal layer 300 may be disposed between the array substrate 200 and the opposing substrate 400. In the liquid crystal layer 300, liquid crystals 310 may be injected.

Hereinafter, the array substrate 200 will be described.

The array substrate 200 may include a first base substrate 210. The first base substrate 210 may be, for example, a transparent insulation substrate. For example, the first base substrate 210 may be a glass substrate, a quartz substrate, a transparent resin substrate, etc.

In an exemplary embodiment of the present inventive concept, the first base substrate 210 may be curved in a particular direction. In an exemplary embodiment of the present inventive concept, the first base substrate 210 may be flexible. For example, the first base substrate 210 may be deformable so that it may be rolled, folded, bent and so on.

A plurality of gate lines 224, a first gate electrode 221, a second gate electrode 222, and a third gate electrode 223 may be disposed on the first base substrate 210.

The gate lines 224 may deliver gate signals and may be extended in a first direction D1.

As used herein, the first direction D1 refers to a direction extending in parallel with a side of the first base substrate 210. In FIG. 2, the side of the first base substrate 210 that extends parallel to the first direction D1 may extend from a left side to a right side. For example, as shown in FIG. 2, the first direction D1 may be defined as a direction indicated by a straight line extending from the left side to the right side. However, the first direction D1 is not limited to being in parallel with a side of the first base substrate 210. The first direction D1 may be a direction indicated by any straight line extending in any direction.

The gate signals may each have a varying voltage value provided from an external source, and the thin-film transistors TR1, TR2, and TR3, to be described below, may be turned on/off in response to the voltage value of the gate signals.

The first to third gate electrodes 221, 222 and 223 may protrude from the gate line 224 and may be elements of the first, second and third thin-film transistors TR1, TR2 and TR3, respectively.

In the gate line 224, a plurality of first gate electrodes 221, a plurality of second gate electrodes 222, and a plurality of third gate electrode 223 may be formed. The arrangement of the first to third gate electrodes 221, 222 and 223 will be described below in describing the first to third thin-film transistors TR1, TR2 and TR3.

The gate line 224 and the first to third gate electrodes 221, 222 and 223 may include: an aluminum-based metal such as aluminum (Al) or an aluminum alloy; a silver-based metal such as silver (Ag) or a silver alloy; a copper-based metal such as copper (Cu) or a copper alloy; a gold-based metal such as gold (Au) or a gold alloy; a molybdenum-based metal such as molybdenum (Mo) or a molybdenum alloy; chromium (Cr); tantalum (Ta); or titanium (Ti). The gate line 224 and the first to third gate electrodes 221, 222 and 223 may be a single layer structure. Alternatively, the gate line 224 and the first to third gate electrodes 221, 222 and 223 may be a multi-layer structure including at least two conductive films having different physical properties.

As described above with reference to FIG. 1, a pixel unit PXU may include a plurality of pixels PXs. In an exemplary embodiment of the present inventive concept, a pixel unit PXU includes three pixels PXs, for example. They are referred to as a first pixel PX1, a second pixel PX2 and a third pixel PX3. It is to be noted that each of the first pixel PX1 and the second pixel PX2 may include the first gate electrode 221 while the third pixel PX3 includes each of the first to third gate electrodes 221, 222 and 223.

A gate insulation film 230 may be disposed on the gate line 224 and the first to third gate electrodes 221, 222 and 223. The gate insulation film 230 may be made of an insulative material, for example, silicon nitride or silicon oxide. The gate insulation film 230 may be a single layer structure or may be a multi-layer structure, which may include two insulation layers having different physical properties from each other.

First to third semiconductor layers 241, 242 and 243 may be disposed on the gate insulation film 230. The first semiconductor layer 241 may overlap at least a part of the first gate electrode 221. The second semiconductor layer 242 may overlap at least a part of the second gate electrode 222. The third semiconductor layer 243 may overlap at least a part of the third gate electrode 223. The first to third semiconductor layers 241, 242 and 243 may include amorphous silicon, polycrystalline silicon or an oxide semiconductor.

The first to third semiconductor layers 241, 242 and 243 may overlap at least a part of a data line 267, first to third source electrodes 261, 262 and 263 to, and/or the first to third gate electrodes 221, 222 and 223.

Although not shown in the drawings, in an exemplary embodiment of the present inventive concept, an ohmic contact element may be disposed on the first to third semiconductor layers 241, 242 and 243. The ohmic contact element may be made of n+ hydrogenated amorphous silicon that is highly doped with n-type impurities, or may be made of silicide. For example, a pair of the ohmic contact elements may be disposed on the first to third semiconductor layers 241, 242 and 243. The ohmic contact elements may allow the electric connection between the first, second and third semiconductor layers 241, 242 and 243 and other elements electrically connected to the first, second and third semiconductor layers 241, 242 and 243 to have ohmic contact properties.

Further, the data line 267, first to third source electrodes 261, 262 and 263, first to third drain electrodes 264, 265 and 266, and a storage line 268 may be disposed on the first to third semiconductor layers 241, 242 and 243 and the gate insulation film 230.

The data line 267 may extend in a second direction D2 and may intersect the gate line 224.

Herein, the second direction D2 may be a direction intersecting the first direction D1 on a plane (e.g., an x-y plane), for example, a plane that faces the base substrate 210. However, exemplary embodiments of the present inventive concept are not limited thereto. The angle made by the second direction D2 intersecting the first direction D1 might not be a right angle. For example, the second direction D2 may be a direction that does not extend in a direction that extend in a direction parallel with the first direction D1.

The data line 267 may be insulated from the gate line 224 by the gate insulation film 230.

The data line 267 may provide the data signal to the first and second source electrodes 261 and 262. The data signal may have a varying voltage value provided from an external source, and the gray scale of each of the first to third pixels PX1, PX2 and PX3 may be controlled in response to the data signal.

The first source electrode 261 may be electrically connected to the data line 267 and may overlap at least a part of the first gate electrode 221. In addition, the second source electrode 262 may be electrically connected to the first source electrode 261 and may overlap at least a part of the second gate electrode 222. In an exemplary embodiment of the present inventive concept, the second electrode 262 may be electrically connected to the data line 267, instead of the first source electrode 261.

The storage line 268 may be extended in the second direction D2 and may intersect the gate line 224. The storage line 268 may be formed in the same layer as the data line 267 and might not overlap with the data line 267. The storage line 268 may be insulated from the gate line 224 by the gate insulation film 230. The gate insulation film 230 may be disposed between the storage line 268 and the gate line 224.

The storage line 268 may provide a storage signal input from an external source to the third source electrode 263. The storage signal may have a constant voltage value provided from the external source and may have a voltage value smaller than a maximum voltage value and larger than a minimum voltage value of the varying voltage value of the data signal.

The third source electrode 263 may be electrically connected to the storage line 268 and may overlap at least a part of the third gate electrode 223.

The first drain electrode 264 may be spaced apart from the first source electrode 261 with the first semiconductor layer 241 disposed therebetween. The first drain electrode 264 and the first source electrode 261 may each overlap at least a part of the first gate electrode 221. The second drain electrode 265 may be spaced apart from the second source electrode 262 with the second semiconductor layer 242 disposed therebetween. The second drain electrode 265 and second source electrode 262 may each overlap at least a part of the second gate electrode 222. The third drain electrode 266 may be spaced apart from the third source electrode 263 with the third semiconductor layer 243 disposed therebetween and may overlap at least a part of the third gate electrode 223. As shown in FIG. 2, the first to third source electrodes 261, 262 and 263 may have a shape similar to a U-shape such that the first, second and third source electrodes 261, 262 and 263 each surround the first, second and third drain electrodes 264, 265 and 266, respectively. Further, gaps may also exist between the first source electrode 261 and the second source electrode 261, between the second source electrode 262 and the third source electrode 263, between the first drain electrode 264 and the second drain electrode 265, and between the second drain electrode 265 and the third drain electrode 266. However, exemplary embodiments of the present inventive concept are not limited thereto. In addition, the first to third source electrodes 261, 262 and 263 may have a rod-like shape such that they may be disposed in parallel with the first to third drain electrodes 264, 265 and 266, respectively. Further, a gap may also, respectively, exist between the first to third source electrodes 261, 262 and 263 and the first to third drain electrodes 264, 265 and 266.

The first semiconductor layer 241 may be disposed between the first source electrode 261 and the first drain electrode 264, which is separated from the first source electrode 261. For example, the first source electrode 261 and the first drain electrode 264 may partially overlap or come in contact with the first semiconductor layer 241. Further, the first source electrode 261 and the first drain electrode 264 may each be disposed on opposite ends from each other on the first semiconductor layer 241. The first semiconductor layer 241 may be disposed between the first source electrode 261 and the first drain electrode 264. A similar arrangement applies to the second drain electrode 265, the second source electrode 262 and the second semiconductor layer 242, and to the third drain electrode 266, the third source electrode 263 and the third semiconductor layer 243.

The data line 267, the storage line 268, the first to third source electrodes 261, 262 and 263, the first to third drain electrodes 264, 265 and 266 may include aluminum, copper, silver, molybdenum, chrome, titanium, tantalum or an alloy thereof. In addition, the aforementioned lines and electrodes have a multi-layer structure composed of a lower layer such as a refractory metal, and a low-resistance upper layer disposed on the lower layer. However, other configurations may be used.

The first gate electrode 221, the first semiconductor layer 241, the first source electrode 261 and the first drain electrode 264 form the first thin-film transistor TR1. The second gate electrode 222, the second semiconductor layer 242, the second source electrode 262 and the second drain electrode 265 form the second thin-film transistor TR2. The third gate electrode 223, the third semiconductor layer 243, the third source electrode 263 and the third drain electrode 266 firm the second thin-film transistor TR3.

The first thin-film transistor TR1 may electrically connect the first source electrode 261 to the first drain electrode 264 in response to a voltage value of the gate signal supplied to the first gate electrode 221. For example, if the voltage value of the gate signal supplied to the first gate electrode 221 reaches the voltage value to turn off the first thin-film transistor TR1, the first source electrode 261 and the first drain electrode 264 may be electrically insulated from each other. Further, if the voltage value of the gate signal supplied to the first gate electrode 221 reaches the voltage value to turn on the first thin-film transistor TR1, the first source electrode 261 and the first drain electrode 264 may be electrically connected to each other via a channel formed in the first semiconductor layer 241.

The channel may be formed in the first semiconductor layer 241 between the first source electrode 261 and the first drain electrode 264. For example, when the first thin-film transistor TR1 is in an on-state, the channel is formed in the first semiconductor layer 241 disposed between the first source electrode 261 and the first drain electrode 264, and the voltage of the data signal may be delivered from the first source electrode 261 to the first drain electrode 264 along the channel.

The data signal delivered to the first drain electrode 264 may be delivered to a first pixel electrode 283, a second pixel electrode 284, or a first sub-pixel electrode 285. Accordingly, the data signal may or might not be delivered depending on the gate signal supplied to the gate line 224. The first pixel electrode 283, the second pixel electrode 284 and the first sub-pixel electrode 285 will be described below.

Likewise, the second thin-film transistor TR2 may electrically connect the second source electrode 262 to the second drain electrode 265 in response to a voltage value of the gate signal supplied to the second gate electrode 222. Accordingly, the data signal supplied to the data line 267 is delivered to a second sub-pixel electrode 286 connected to the second drain electrode 265 via the second drain electrode 265.

In addition, the third thin-film transistor TR3 may electrically connect the third source electrode 263 to the third drain electrode 266 in response to a voltage value of the gate signal supplied to the third gate electrode 223. Accordingly, the storage signal supplied to the storage line 268 is delivered to a second sub-pixel electrode 286 connected to the third drain electrode 266 via the third drain electrode 266.

Unlike the first and second pixel electrodes 283 and 284 and the first sub-pixel electrode 285 that may all receive the data signal only from the first drain electrode 264, the second sub-pixel electrode 286 may receive the data signal from the second drain electrode 265 and may receive the storage signal from the third drain electrode 266. Accordingly, the voltage value corresponding to the data signal may be provided to the first pixel electrode 283, the second pixel electrode 284 and the first sub-pixel electrode 285, but one voltage value between the voltage value of the data signal and the voltage value of the storage signal may be provided to the second sub-pixel electrode 286.

The one voltage value between the voltage value of the data signal and the voltage value of the storage signal may refer to any voltage value that is smaller than the voltage value of the data signal and larger than the voltage value of the storage signal. In addition, the one voltage value between the voltage value of the data signal and the voltage value of the storage signal may refer to any voltage value that is larger than the voltage value of the data signal and smaller than the voltage value of the storage signal. The one voltage value between the voltage value of the data signal and the voltage value of the storage signal may be determined based on the spacing between the second source electrode 262 and the second drain electrode 265 and based on the spacing between the third source electrode 263 and the third drain electrode 266.

Therefore, each of the first pixel PX1 and the second pixel PX2 includes the first thin-flair transistor TR1 only, while the third pixel PX3 includes the first to third thin-film transistors TR1, TR2 and TR3.

Accordingly, the first pixel PX1 includes the first pixel electrode 283, and the tilt angle of the liquid crystals 310 disposed in the first pixel PX1 may be determined based on the voltage applied to the first pixel electrode 283. Further, the second pixel PX2 includes the second pixel electrode 284, and the tilt angle of the liquid crystals 310 disposed in the second pixel PX2 is determined based on the voltage applied to the second pixel electrode 284.

Further, the third pixel PX3 includes the first sub-pixel electrode 285, the second sub pixel electrode 286, and the first to third thin-film transistors TR1, TR2 and TR3, such that different voltages may be applied to the first sub-pixel electrode 285 and the second sub-pixel electrode 286. Accordingly, the tilt angle of some of the liquid crystals 310 disposed in the third pixel PX3 may be determined based on the voltage applied to the first sub-pixel electrode 285, and the tilt angle of the other of the liquid crystals 310 in the third pixel PX3 may be determined based on the voltage applied to the second sub-pixel electrode 286.

Based on the above-described structure of the third pixel PX3, the visibility of the LCD device may be increased. For example, if the third pixel PX3 is a pixel PX for producing blue color, the visibility of the LCD device may be increased when a skin color is being displayed in an image.

In addition, unlike the third pixel PX3 including the first to third thin-film transistors TR1, TR2 and TR3, each of the first pixel PX1 and the second pixel PX2 includes the thin-film transistor TR1 and does not include the second and third thin-film transistors TR2 and TR3. Thus, a reduction in transmittance of a pixel may be avoided.

In addition, the first to third pixels PX1, PX2 and PX3 included in a single pixel unit PXU may be controlled by the same gate line 224. Accordingly, the first thin-film transistor TR1 included in the first pixel PX1, the first thin-film transistor TR1 included in the second pixel PX2, and the first to third thin-film transistors TR1, TR2 and TR3 included in the third pixel PX3 may be arranged in parallel in the second direction D2 along the same gate line 224.

A passivation layer 271 may be disposed on the gate insulation film 230 and the first to third thin-film transistors TR1, TR2 and TR3. The passivation layer 271 may be made of, for example, an inorganic insulative material and may, for example, cover the first to third thin-film transistors TR1, TR2 and TR3. The passivation layer 271 may protect the first to third thin-film transistors TR1, TR2 and TR3 from other elements and impurities that may be disposed over the first to third thin-film transistors TR1, TR2 and TR3.

A planarization layer 272 may be disposed on the passivation layer 271. The planarization layer 272 may provide a flat suffice above the passivation layer 271. The planarization layer 272 may be made of, for example, an organic material. In an exemplary embodiment of the present inventive concept, the planarization layer 272 may be made of a photosensitive organic composition. In an exemplary embodiment of the present inventive concept, the planarization layer 272 may be made of a photosensitive organic composition containing a pigment for reproducing a color, or an additional photosensitive organic composition layer may be disposed under the planarization layer 272. In either case, the pigment works as the color filter layer and, thus, use of the pigment may eliminate the need for the color filter layer of the opposing substrate 400 to be described later.

The passivation layer 271 and/or the planarization layer 272 may be omitted.

Further, first and second contact holes 281 and 282 may be formed in the planarization layer 272 and the passivation layer 271 such that a part of each of the first to third thin-film transistors TR1, TR2 and TR3 may be exposed. Further, the part exposed may be part of each of the first to third drain electrodes 264, 265 and 266, respectively.

The first contact hole 281 may vertically penetrate the planarization layer 272 and the passivation layer 271. The first contact hole 281 may expose a part of the first drain electrode 264.

The second contact hole 282 may vertically penetrate the planarization layer 272 and the passivation layer 271. The second contact hole 282 may expose a part of each of the second drain electrode 265 and the third drain electrode 266.

The first pixel electrode 283, the second pixel electrode 284, the first sub-pixel electrode 285 and the second sub-pixel electrode 286 may be disposed on the planarization layer 272. The first pixel electrode 283, the second pixel electrode 284 and the first sub-pixel electrode 285 may be connected to the first drain electrode 264 via the first contact hole 281 to receive voltage from the first drain electrode 264. The second sub-pixel electrode 286 may be connected to the second and third drain electrodes 265 and 266 via the second contact hole 282 to receive voltage from the second drain electrode 265 and voltage from third drain electrodes 266.

The first pixel electrode 283 may be disposed in the first pixel PX1, and the second pixel electrode 284 may be disposed in the second pixel PX2. The first pixel electrode 283 and the second pixel electrode 284 may have substantially the same shape as each other. However, the area occupied by the first sub-pixel electrode 285 may be smaller than the areas occupied by the first pixel electrode 283. Further, the area occupied by the first sub-pixel electrode 285 may be smaller than that of the second pixel electrode 284. Unlike the first pixel PX1 and the second pixel PX2 may be disposed alone in the first pixel electrode 283 and the second pixel electrode 284. The first sub-pixel electrode 285 may be disposed in the third pixel PX3 along with the second sub-pixel electrode 286. The sum of the area occupied by the first sub-pixel electrode 285 and the area occupied by the second sub-pixel electrode 286 may be equal to or less than the area occupied by the first pixel electrode 283 or the area occupied by the second pixel electrode 284.

Each of the first pixel electrode 283, the second pixel electrode 284, the first sub-pixel electrode 285, and the second sub-pixel electrode 286 may be made of, for example, a transparent conductive material such as indium tin oxide (ITO), indium zinc oxide (IZO), indium tin zinc oxide (ITZO), Al-doped zinc oxide (AZO).

The first pixel electrode 283 may be disposed in the first pixel PX1 such that the first pixel electrode 283 forms fine slits in the first pixel PX1 and may form four domains to increase visibility. The second pixel electrode 284 may be disposed, in a similar manner, in the second pixel PX2.

The first sub-pixel electrode 285 and the second sub-pixel electrode 286 may be disposed in the third pixel PX3 by forming a pattern in the third pixel PX3. The first sub-pixel electrode 285 along with the second sub-pixel electrode 286 may form four domains. However, the voltage applied to the first sub-pixel electrode 285 may be different from the voltage applied to the second sub-pixel electrode 286. Further, the first sub-pixel electrode 285 may be separated from the second sub-pixel electrode 286. For example, the second sub-pixel electrode 286 may surround the first sub-pixel electrode 285. The first sub-pixel electrode 285 may be connected to the first thin-film transistor TR1. The second sub-pixel electrode 286 may be connected to the second and third thin-film transistors TR2 and TR3.

An alignment layer 290 may be disposed on the first pixel electrode 283, the second pixel electrode 284, the first sub-pixel electrode 285 and the second sub-pixel electrode 286. The first alignment layer 290 may control an initial orientation of the liquid crystals 310 that are injected into the liquid-crystal layer 300. The first alignment layer 290 may be omitted.

Hereinafter, the opposing substrate 400 will be described.

The opposing substrate 400 may include a second base substrate 410, a light-blocking element 420, a common electrode 480, an overcoat layer 440 and a second alignment layer 490.

The second base substrate 410 may be disposed such that it faces the first base substrate 210. The second base substrate 410 may be sufficiently durable so as to withstand an external impact. The second base substrate 410 may be a transparent insulation substrate. For example, the second base substrate 410 may be a glass substrate, a quartz substrate, a transparent resin substrate, etc. The second base substrate 410 may be a flat plate, although it may be curved in a particular direction. In an exemplary embodiment of the present inventive concept, the second base substrate 410 may be flexible. For example, the second base substrate 410 may be deformable so that it may be rolled, folded, bent and so on.

The light-blocking element 420 may be disposed on the liquid crystal layer 300, The light-blocking element 420 may be disposed such that it overlaps the data line 267, the gate line 224, the first to third thin-film transistor TR1, TR2 and TR3 and the first and second contact holes 281 and 282, thereby blocking light from leaking when the liquid crystals 310 are misaligned. For example, since each of the first pixel PX1 and the second pixel PX2 does not include the second and third thin-film transistors TR2 and TR3, unlike the third pixel PX3, the area occupied by the light-blocking element 420 in each of the first pixel PX1 and the second pixel PX2 may be smaller than the area occupied by the light-blocking element 420 in the third pixel PX3. Accordingly, the transmittance may be reduced less compared to an LCD device in which each of the first to third pixels PX1, PX2 and PX3 includes the first to third thin-film transistors TR1, TR2 and TR3.

The color filter layer may be disposed on the second base substrate 410 and the light-blocking element 420. For example, the color filter may be disposed below the second base substrate 410. The color filter layer may allow a particular wavelength of a light that comes through the first base substrate 210 to exit through the second base substrate 410, such that the light has a particular color.

The color filter layer may be made of a photosensitive organic composition containing a pigment for reproducing a color and may include either red, green or blue pigments.

Each of the pixels PXs may include the color filter layer. In an exemplary embodiment of the present inventive concept, the color filter layer may include a first color filter 431 disposed in the first pixel PX1, a second color filter disposed in the second pixel PX2, and a third color filter disposed in the third pixel PX3.

The first color filter 431 may be a red color filter that allows a light passing therethrough to have red color. The second color filter may be a green color filter that allows a light passing therethrough to have green color. The third color filter may be a blue color filter that allows a light passing therethrough to have blue color.

However, exemplary embodiments of the present inventive concept are not limited thereto. For example, first color filter 431 may be a green color filter, and the second color filter may be a red color filter. However, in the pixel PX3 including the second and third thin-film transistors TR2 and TR3, a blue color filter is disposed.

The transmittance of the third pixel PX3 in which the liquid crystals 310 are controlled at two or more tilt angles may be lower than the transmittance of each of the first pixel PX1 and the second pixel PX2 in which the liquid crystals 310 are controlled at one tilt angle. The lower transmittance may be caused by the third pixel PX3 in which the liquid crystals 310 controlled at two or more tilt angles, requiring more elements, e.g., the second thin-film transistor TR2 and the third thin-film transistor TR3.

In this regard, the red and green color filters contribute to color reproduction more than the blue color filter does. Accordingly, if liquid crystals 310 in the pixel PX including a red or green color filter are controlled at two or more tilt angles, transmittance may be reduced. In addition, blue color contributes to color reproduction less than red and green colors do. Accordingly, if liquid crystals 310 in the pixel PX including a blue color filter are controlled at two or more tilt angles, a reduction in transmittance may be reduced to lesser extent.

In addition, if liquid crystals 310 in the pixel PX including a blue color filter are controlled at two or more tilt angles, the visibility when skin color is produced may be increased, compared to liquid crystals 310 in the pixel PX including a red or green color filter being controlled at two or more tilt angles. Experiments for supporting such effects will be described in detail below.

The overcoat layer 440 may be disposed on the light-blocking element 420 and the color filter layer. For example, the overcoat layer 440 may be disposed under the light blocking element 420 and the color filter. The overcoat layer 440 may reduce level difference between the light-blocking element 420 and the color filter layer. In an exemplary embodiment of the present inventive concept, the overcoat layer 440 may be omitted.

The common electrode 480 may be disposed on the overcoat layer 440. For example, the common electrode 480 may be disposed on the liquid crystal layer 300. If there is no overcoat layer 440, the common electrode 480 may be disposed on the light-blocking element 420 and the color filter layer. The common electrode 480 may be made of, for example, a transparent conductive material such as indium tin oxide (ITO), indium zinc oxide (IZO), indium tin zinc oxide (ITZO), and/or Al-doped zinc oxide (AZO). The common electrode 480 may be formed throughout the entire surface of the second base substrate 410. A common signal may be applied to the common electrode 480 such that the common electrode 480 may form an electric field along with the first pixel electrode 283, the second pixel electrode 284, the first sub-pixel electrode 285 and the second sub-pixel electrode 286.

The second alignment layer 490 may be disposed on the common electrode 480. For example, the second alignment layer 490 may be disposed under the common electrode 480. The second alignment layer 490 may perform a similar functionality with the first alignment layer 290 described above. For example, the second alignment layer 490 may control an initial orientation of the liquid crystals 310 injected into the liquid-crystal layer 300.

Hereinafter, the liquid-crystal layer 300 will be described.

The liquid-crystal layer 300 may include liquid crystals 310 having dielectric anisotropy and refractive anisotropy. The liquid crystals 310 may be vertically aligned between the array substrate 200 and the opposing substrate 400 when no electric field is applied across the array substrate 200 and the opposing substrate 400. When electric field is applied across the array substrate 200 and the opposing substrate 400, the liquid crystals 310 may be rotated in a particular direction between the array substrate 200 and the opposing substrate 400 to thereby transmit or block light. For example, the liquid crystals 310 may be horizontally aligned.

Figure 4:
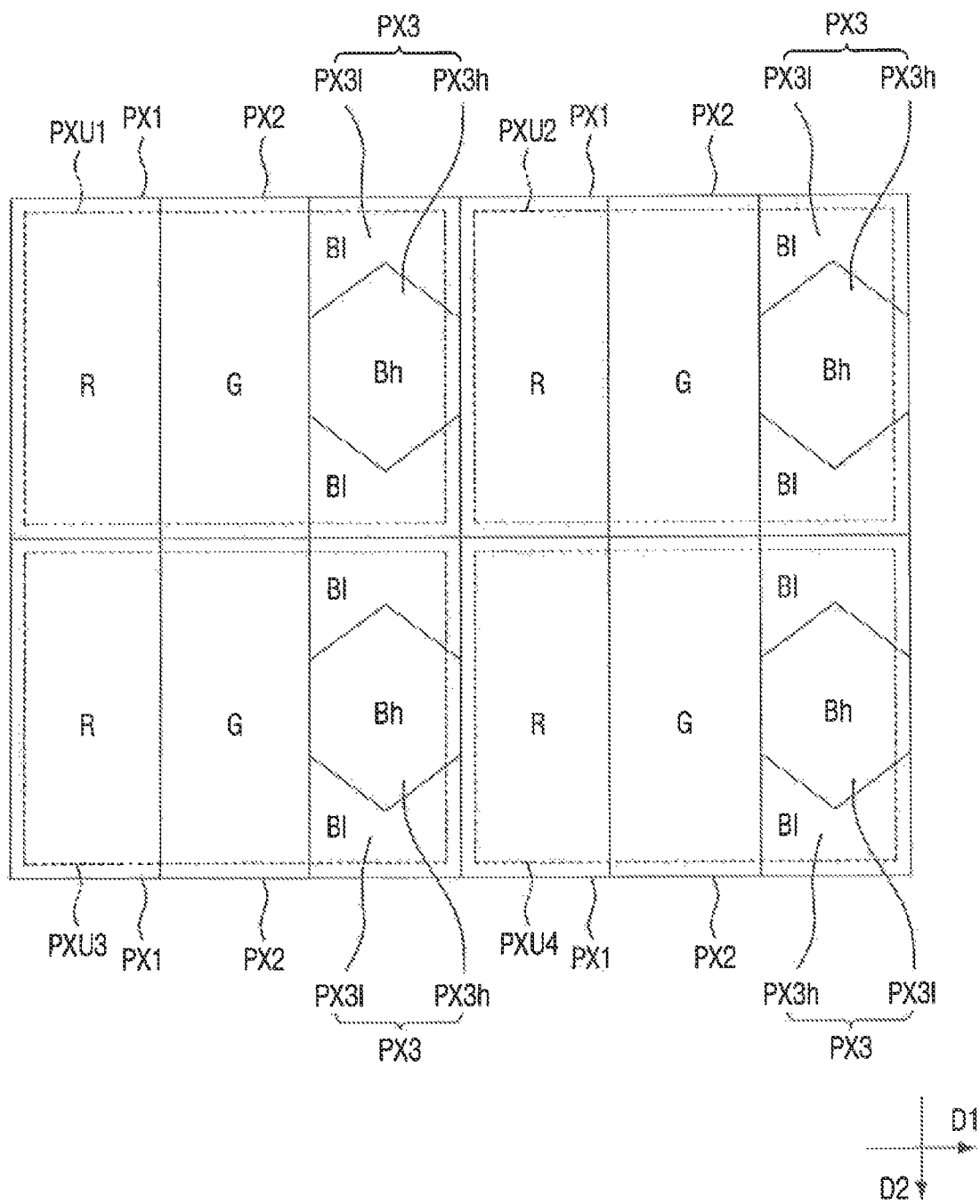
FIG. 4 is a view schematically showing pixel units according to an exemplary embodiment of the present inventive concept.

FIG. 4 is a view schematically showing pixel units according to an exemplary embodiment of the inventive concept.

FIG. 4 shows a total of four pixel units. In FIG. 4, a pixel unit disposed on the upper left side is referred to as a first pixel unit PXU1, a pixel unit disposed on the upper right side (e.g., adjacent to the first pixel unit PXU1) is referred to as a second pixel unit PXU2, a pixel unit disposed on the lower left side (e.g., below the first pixel unit PXU1) is referred to as a third pixel unit PXU3, and a pixel unit disposed on the lower right side (e.g., below the second pixel unit PXU2) is referred to as a fourth pixel unit PXU4. Each of the first to fourth pixel units PXU1, PXU2, PXU3 and PXU4 may have substantially the same shape and structure.

Referring to FIG. 4, each of the first to fourth pixel units PXU1, PXU2, PXU3 and PXU4 includes a first pixel PX1 for producing red color, a second pixel PX2 for producing green color, and a third pixel PX3 for producing blue color.

Each of the first pixel PX1, the second pixel PX2 and the third pixel PX3 may have a substantially rectangular shape. As the first to third pixels PX1, PX2 and PX3 have a rectangular shape, each of first to fourth pixel units PXU1, PXU2, PXU3 and PXU4 formed by connecting the first to third pixels PX1, PX2 and PX3 may also have a substantially rectangular shape.

The third pixel PX3 for producing blue color may include a high grayscale area PX3$h$ in which a relatively bright grayscale is presented, and a low grayscale area PX3$l$ in which a relatively dark grayscale is presented. The first sub-pixel electrode 285 shown in FIG. 2 may be disposed in the high grayscale area PX3$h$. The second sub-pixel electrode 286 shown in FIG. 2 may be disposed in the low grayscale area PX3$l$. For example, the low grayscale area PX3$l$ may have grayscale values ranging between 0 and 127, and the high grayscale area PX3$h$ may have grayscale values ranging between 128 and 255. However, exemplary embodiments of the present inventive concept are not limited thereto.

Figure 5:
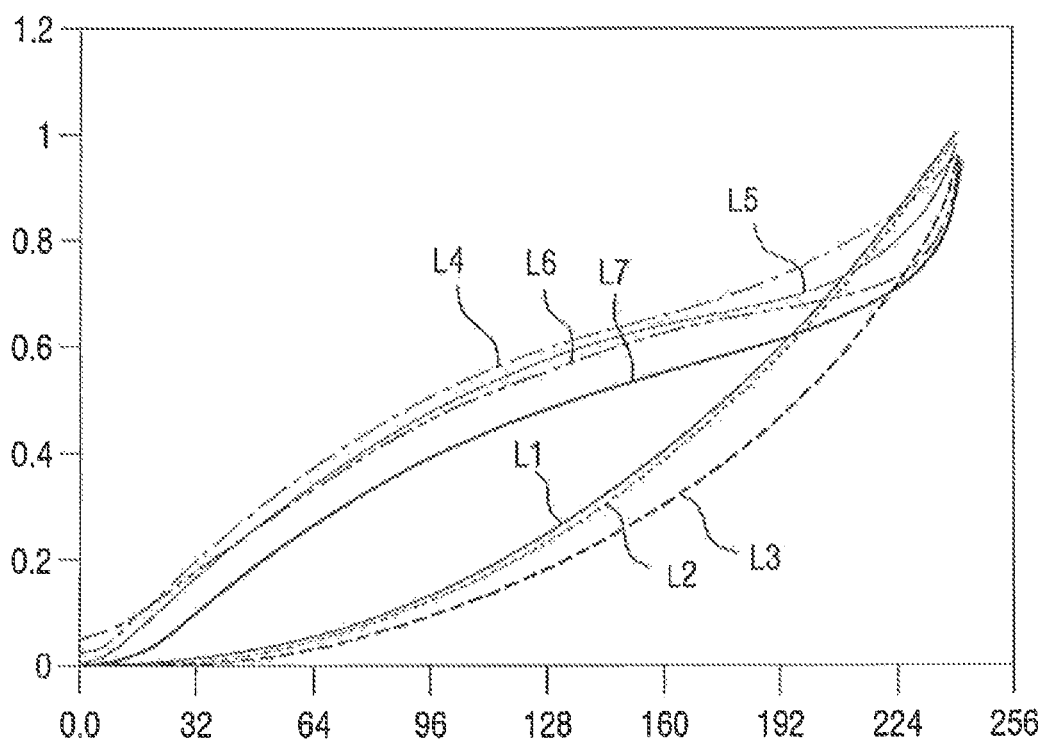
FIG. 5 is a graph showing brightness versus grayscale level of an LCD device according to an exemplary embodiment of the present inventive concept.

FIG. 5 is a graph showing brightness versus grayscale level of an LCD device according to an exemplary embodiment of the present inventive concept.

In FIG. 5, the x-axis represents grayscale, and the y-axis represents actually observed brightness. The minimum level of the grayscale may be zero, while the maximum level of the grayscale may be 256. When the LCD device was viewed from the front, the brightness at the grayscale level of 256 was set to 1.

The lines L1 to L3 represent brightness at different grayscale levels when the LCD device was viewed from the front. The lines L4 to L7 represent brightness at different grayscale levels when the LCD device was viewed from the side at forty-five degrees.

In addition, the first and fourth lines L1 and L4 are measured for a pixel PX for producing red color. The second and fifth lines L2 and L5 are measured for a pixel PX for producing green color. The third, sixth and seventh lines L3, L6 and L7 are measured for a pixel PX for producing blue color.

The first to sixth lines L1, L2, L3, L4, L5 and L6 represent brightness versus grayscale when the pixel PX includes one pixel electrode. The seventh line L7 represents brightness versus grayscale when the pixel PX includes the two sub-pixel electrodes 285 and 286.

It can be seen from FIG. 5 that the fourth to seventh lines L4 to L7 measured when viewed from the side look brighter than the first to third lines L1 to L3 measured when viewed from the front at the same grayscale levels. Such difference in brightness between the front and side may degrade image visibility.

Nonetheless, it is observed that the seventh line L7 is closer to the sixth line L6 than the third line L3 is. Accordingly, it can be seen that the visibility may be increased when the pixel PX includes two sub-pixel electrodes compared to when the pixel PX includes only one pixel electrode.

Figure 6:
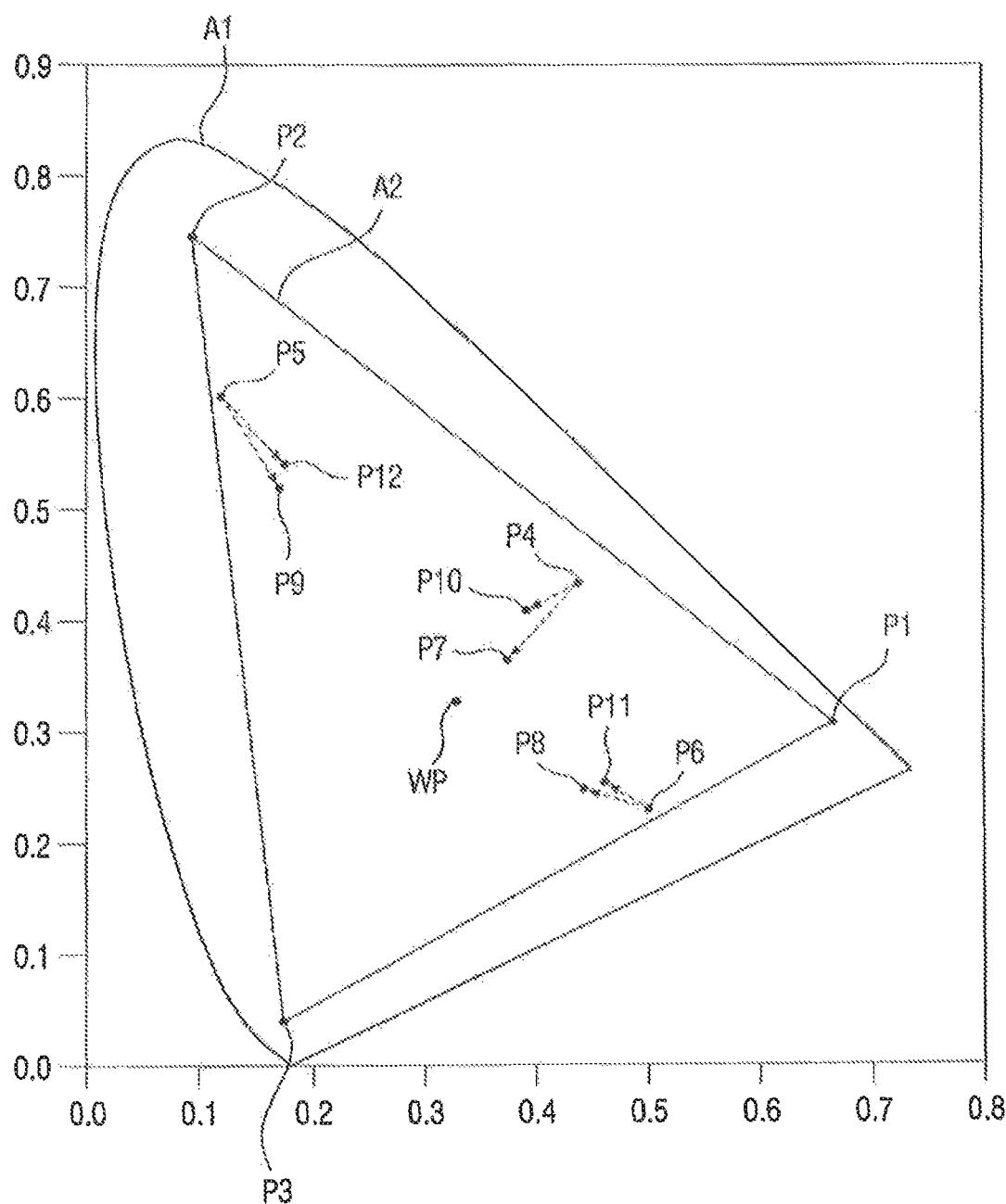
FIG. 6 is a xy chromaticity diagram showing color gamut of a liquid-crystal display (LCD) device according to an exemplary embodiment of the present inventive concept.

FIG. 6 is an xy chromaticity diagram showing color gamut of a liquid-crystal display (LCD) device according to an exemplary embodiment of the present inventive concept.

FIG. 6 shows the color gamut of the LCD device according to the exemplary embodiment of the present inventive concept by using xy color chromaticity diagram of the XYZ colorimetric system adopted by the Commission International de l'eclairage (CIE).

The CIE area A1 is a color space defined by the Commission International de l'eclairage and represents all colors in the natural world.

Triangle A2 depicted in CIE, area A1 represents the color gamut of the LCD device according to an exemplary embodiment of the present inventive concept.

Each vertex of the triangle A2 corresponds to a brightest possible value for red, green and blue colors of that chromaticity, respectively. For example, the first point P1 represents pure red color, the second point P2 represents pure green color, and the third point P3 represents pure blue color.

The fourth to twelfth points P4 to P12 were measured under the conditions, respectively, as indicated in the table below:

TABLE 1

| | | | |
|---|---|---|---|
| Front | Each of the red, green and blue pixels includes one pixel electrode | Skin color<br>Red color<br>Green color | Fourth point (P4)<br>Fifth point (P5)<br>Sixth point (P6) |
| Side | Each of the red, green and blue pixels includes one pixel electrode | Skin color<br>Red color<br>Green color | Seventh point (P7)<br>Eighth point (P8)<br>Ninth point (P9) |
| | Each of the red and green pixels includes one pixel electrode while the blue pixel includes two sub-pixel electrodes | Skin color<br>Red color<br>Green | Tenth point (P10)<br>Eleventh point (P11)<br>Twelfth point (P12) |

According to the relationship shown in Table 1, the seventh to ninth points P7, P8 and P9 measured at the side are moved closer toward the white point WP representing white color than the fourth to sixth points P4, P5 to P6 measured at the front are. For example, the side may be viewed brighter than the front, such that the visibility may be degraded.

However, the tenth to the twelfth points P10, P11 and P12 measured at the side when each of the red and green pixels PX includes one pixel electrode while the blue pixel PX includes two sub-pixel electrode are moved toward the white point WP less than the seventh to ninth points P7, P8 and P9 measured at the side when each of the red, green and blue pixels PX includes one electrode.

In addition, the visibility may be increased when skin color is reproduced more than when red color is reproduced or when the green color is reproduced (e.g., the difference between the seventh point P7 and the tenth point P10 is larger than the difference between the eighth point P8 and the eleventh point P11 or the difference between the ninth point P9 and the twelfth point P12). Accordingly, it can be seen that visibility may be increased when skin color is reproduced.

For example, it can be seen that the visibility may be increased when each of the red and green pixels PX includes only one pixel electrode while the blue pixel PX includes two sub-pixel electrodes. In addition, it may be seen that the visibility may be increased when skin color is reproduced.

Figure 7:
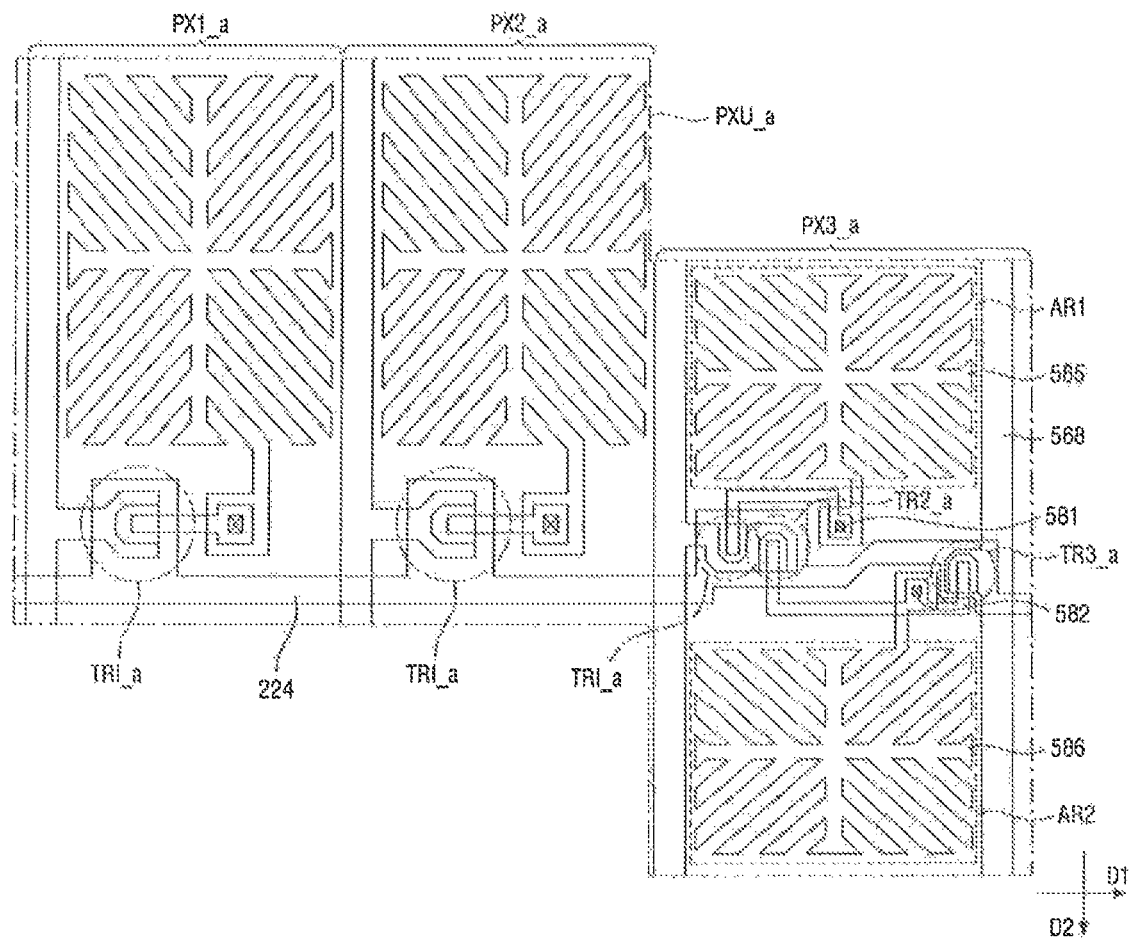
FIG. 7 is a layout diagram of a single pixel disposed in a display panel according to an exemplary embodiment of the present inventive concept.

FIG. 7 is a layout diagram of a single pixel disposed in a display panel 100 according to an exemplary embodiment of the present inventive concept.

In the following description, the same or similar elements will be denoted by the same or similar reference numerals, and redundant descriptions may be omitted or briefly described.

Referring to FIG. 7, a single pixel unit PXU_a includes first to third pixels PX1_a, PX2_a and PX3_a. A first color filter 431 for producing a red color may be disposed in the first pixel PX1_a. A second color filter for producing a green color may be disposed in the second pixel PX2_a. A third color filter for producing blue color may be disposed in the third pixel PX_a.

Unlike an exemplary embodiment of the present inventive concept shown in FIG. 2 where the second sub-pixel electrode 286 surrounds the first sub-pixel electrode 285, a first sub-pixel electrode 585 may be separated from a second sub-pixel electrode 586 in the third pixel PX3_a, according to an exemplary embodiment of the present inventive concept. For example, the first sub-pixel electrode 585 may be disposed in a first area AR1 having a rectangular shape, and the second sub-pixel electrode 586 may be disposed in a second area AR2 having a rectangular shape. The second area AR2 may be parallel to the first area AR1. Further, a gate line 224, the first to third thin-film transistors TR1_a, TR2_a and TR3_a of the third pixel PX3_a, and first and second contact holes 581 and 582 may be disposed between the first area AR1 and the second area AR2.

Accordingly, the first thin-film transistor TR1_a disposed in the first pixel PX1_a may be disposed along a side of a first pixel electrode 583, and the second thin-film transistor TR1_a disposed in the second pixel PX2_a may be disposed along a side of a second pixel electrode 584. However, the first to third thin-film transistors TR1_a, TR2_a and TR3_a disposed in the third pixel PX3_a may be disposed between the first sub-pixel electrode 585 and the second sub-pixel electrode 586. The first thin-film transistor TR1_a of the first pixel PX1_a, the first thin-film transistor TR1_a of the second pixel PX2_a, and the first to third thin-film transistors TR1_a, TR2_a and TR3_a of the third pixel PX3_a may be connected to the same gate line 224, and thus may be parallel to one another. Accordingly, the overall shape of the pixel unit PXU_a might not be a rectangular shape.

For example, each of the first pixel PX1_a, the second pixel PX2_a and the third pixel PX3_a may be disposed in an area of the single pixel unit PXU_a that has a rectangular shape. Further, the first pixel PX1_a and the second pixel PX2_a may be adjacent to each other and may be disposed in a generally rectangular shape. However, the third pixel PX3_a disposed adjacent to the second pixel PX2_a may be dislocated with the second pixel PX2_a. For example, the third pixel PX3 might not be aligned with the second pixel PX2_a. Accordingly, the overall shape of the pixel unit PXU_a including the first to third pixels PX1_a, PX2_a and PX3_a might not be a rectangular shape, but may have a shape of two rectangles dislocated (e.g., misaligned) with each other.

Additional descriptions thereof will be given with reference to FIG. 8.

Figure 8:
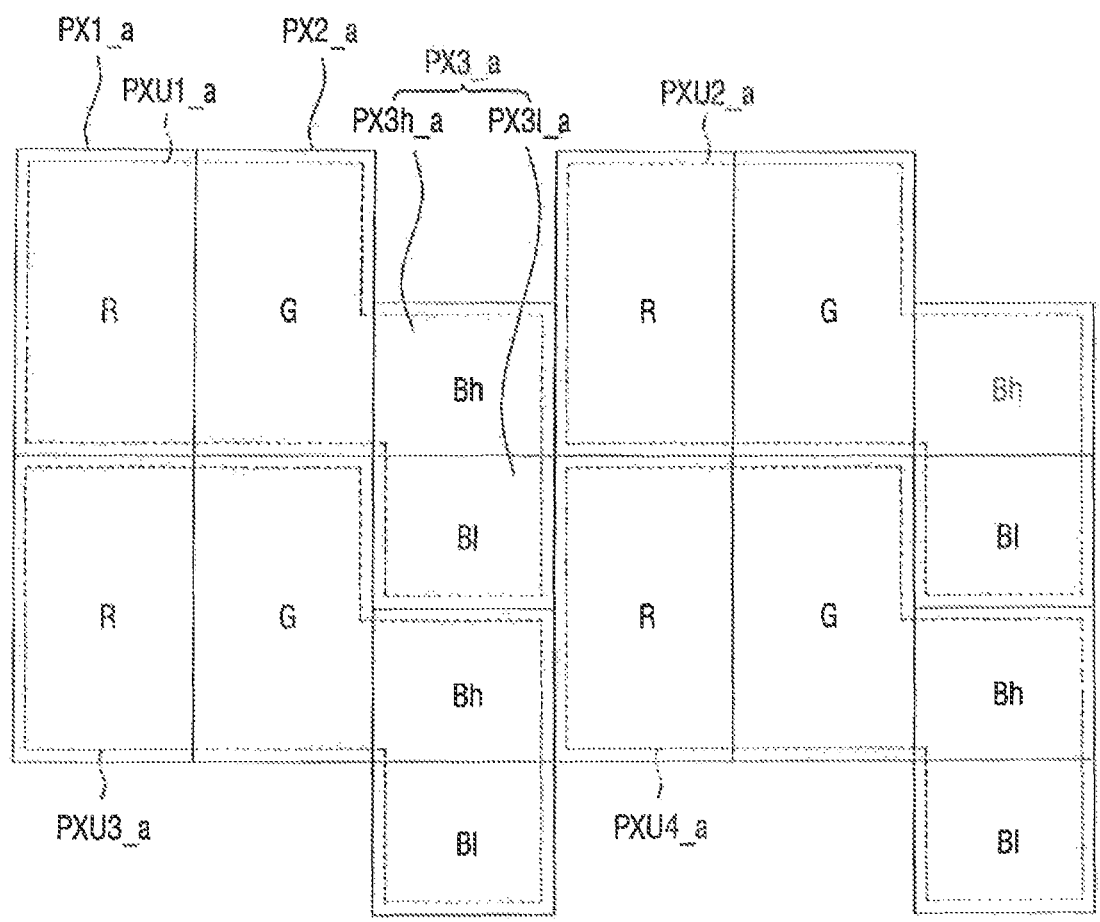
FIG. 8 is a view schematically showing pixel units of an exemplary embodiment of the present inventive concept shown in FIG. 7.
Figure 8:
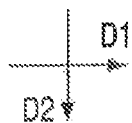

FIG. 8 is a view schematically showing pixel units of an exemplary embodiment of the present inventive concept shown in FIG. 7.

FIG. 8 shows a total of four pixel units. In FIG. 8, a pixel unit disposed on the upper left side may be referred to as a first pixel unit PXU1_a, a pixel unit disposed on the upper right side (e.g., adjacent the first pixel unit PXU1_a) may be referred to as a second pixel unit PXU2_a, a pixel unit disposed on the lower left side (e.g., below the first pixel unit PXU1_a) may be referred to as a third pixel unit PXU3_a, and a pixel unit disposed on the lower right side (e.g., below the second pixel unit PXU2_a) may be referred to as a fourth pixel unit PXU4_a, Each of the first to fourth pixel units PXU1_a, PXU2_a, PXU3_a and PXU4_a may have substantially the same shape and structure.

Referring to FIG. 8, each of the first to fourth pixel units PXU1_a, PXU2_a, PXU3_a and PXU4_a includes a first pixel PX1_a for producing red color, a second pixel PX2_a for producing green color, and a third pixel PX3_a for producing blue color.

Each of the first pixel PX1_a, the second pixel PX2_a and the third pixel PX3_a may have a substantially rectangular shape. The first pixel PX1_a may be parallel with the second pixel PX2_a, while the third pixel PX3_a may be dislocated with the second pixel PX2_a. Therefore, the overall shape of each of the first to fourth pixel units PXU1_a, PXU2_a, PXU3_a and PXU4_a may have the shape of two adjacent rectangles dislocated with respect to each other. As the first to fourth pixel units PXU1_a, PXU2_a, PXU3_a and PXU4_a have substantially the same shape, the first to fourth pixel units PXU1_a, PXU2_a, PXU3_a and PXU4_a may be arranged in a matrix in the display area DA of the display panel 100.

To drive the first to fourth pixel units PXU1_a, PXU2_a, PXU3_a and PXU4_a, two gate lines may be disposed such that they are extended in the first direction D1, and three data lines may be disposed such that they are extended in the second direction D2.

Only the third pixel PX3_a for producing blue color may include a high grayscale area PX3h_a in which relatively bright grayscale may be presented, and a low grayscale area PX3l_a in which relatively dark grayscale may be presented. Further, the first sub-pixel electrode 585 shown in FIG. 7 may be disposed in the high grayscale area PX3h_a. Further, the second sub-pixel electrode 586 shown in FIG. 2 may be disposed in the low grayscale area PX3l_a.

Figure 9:
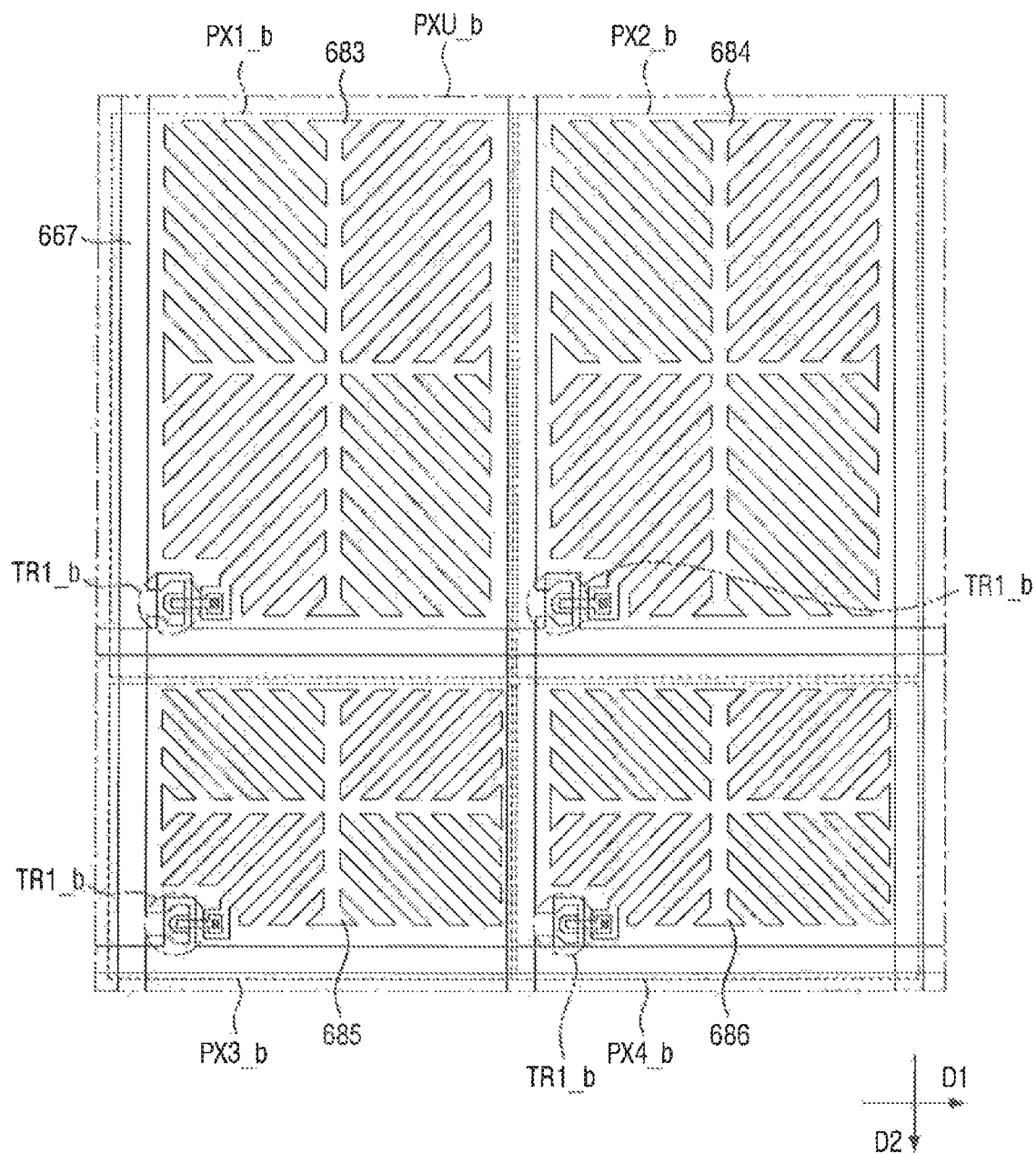
FIG. 9 is a layout diagram of a single pixel disposed in a display panel according to an exemplary embodiment of the present inventive concept.
Figure 10:
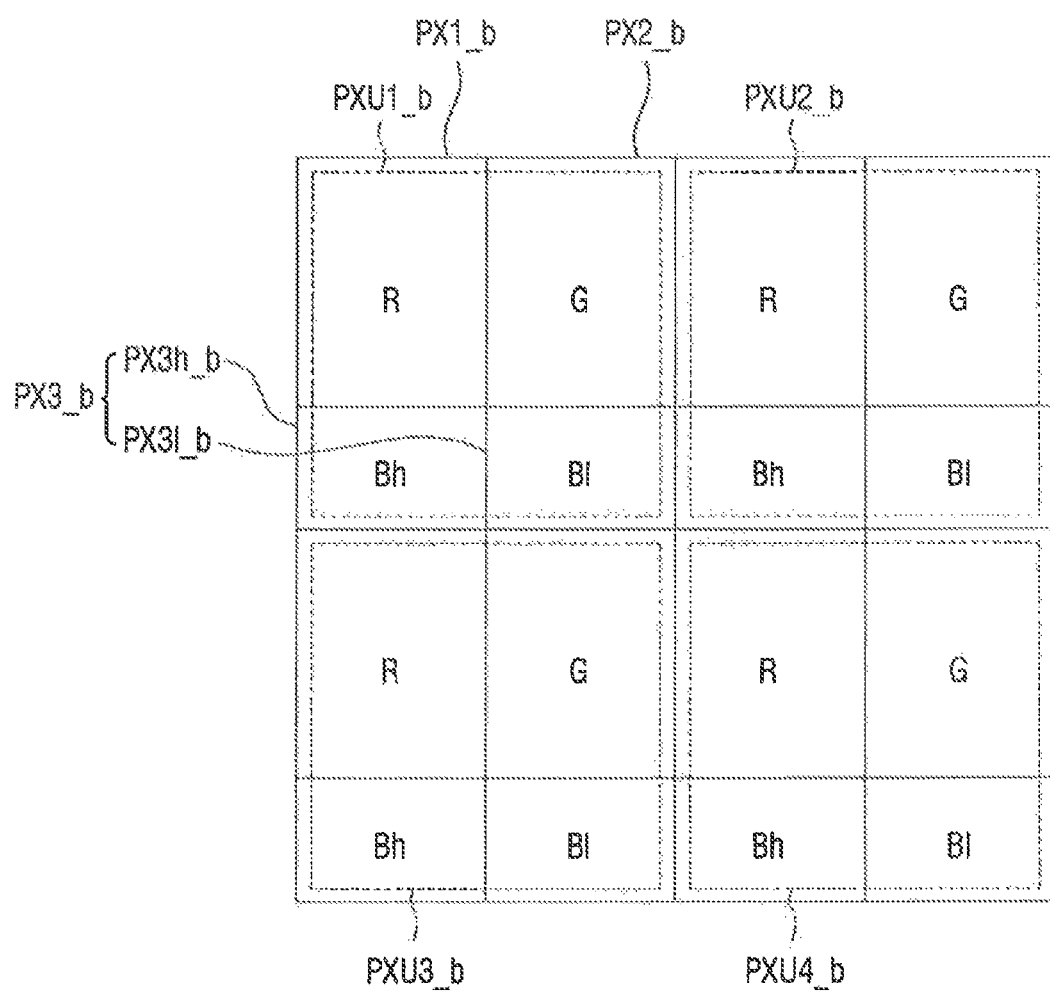
FIG. 10 is a view schematically showing pixel units of an exemplary embodiment of the present inventive concept shown in FIG. 9.
Figure 10:
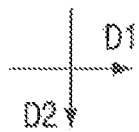

Although the high grayscale area PX3h_a is disposed above the low grayscale area PX3l_a in an exemplary embodiment of the present inventive concept, this is merely illustrative of one possible approach. For example, the low grayscale area PX3l_a may be disposed above the high grayscale area PX3h_a in an exemplary embodiment of the present inventive concept. The location of the high grayscale area PX3h_a and the low grayscale area PX3l_a may be determined based on their respective areas. For example, since it is desired that the overall shape of a single pixel unit PXU has a rectangular shape, the high grayscale area PX3h_a may be disposed above the low grayscale area PX3l_a if the high grayscale area. PX3h_a is larger than the low grayscale area PX3l_a. In addition, the low grayscale area PX3l_a may be disposed above the high grayscale area PX3h_a if the low grayscale area PX3l_a is larger than the high grayscale area PX3h_a FIG. 9 is a layout diagram of a single pixel disposed in a display panel according to an exemplary embodiment of the present inventive concept. FIG. 10 is a view schematically showing pixel units of an exemplary embodiment of the present inventive concept shown in FIG. 9.

An exemplary embodiment of the present inventive concept will be described while focusing on elements that may be different from those of exemplary embodiments of the present inventive concept shown in FIGS. 2 and 4.

Unlike the pixel units PXUs including the first to third pixels PX1, PX2 and PX3 shown in FIGS. 2 and 4, the pixel unit PXU_b, according to an exemplary embodiment of the present inventive concept shown in FIGS. 9 and 10, may include first to fourth pixels PX1_b, PX2_b, PX3_b and PX4_b.

In addition, in the pixel unit PXU shown in FIGS. 2 and 4, each of the first pixel PX1 and the second pixel PX2 includes the first thin-film transistor TR1, and the third pixel PX3 includes the first to third thin-film transistors TR1, TR2 and TR3. In contrast, in the pixel unit PXU_b according to an exemplary embodiment of the present inventive concept shown in FIGS. 9 and 10, all of the first to fourth pixels PX1_b, PX2_b, PX3_b and PX4_b include a first thin-film transistor TR1_b only.

Accordingly, the pixel unit PXU shown in FIGS. 2 and 4 may be connected to three data lines 267, one gate line 224 and one storage line 268 to drive the first to third pixels PX1, PX2 and PX3. The pixel unit PXU_b shown in FIGS. 9 and 10 may be driven with two data lines 667 and two gate lines 624.

For example, the pixel unit PXU_b, according to an exemplary embodiment of the present inventive concept, may include a first pixel PX1_b disposed on the upper left side, a second pixel PX2_b disposed on the upper right side (e.g., adjacent the first pixel PX1_b), a third pixel PX3_b disposed on the lower left side (e.g., below the first pixel PX1_b), and a fourth pixel PX4_b disposed on the lower right side (e.g., below the second pixel PX2_b). For example, the first to fourth pixels PX1_b, PX2_b, PX3_b and PX4_b may be arranged in a two-by-two matrix.

The first pixel PX1_b may include a first pixel electrode 683. The second pixel PX2_b may include a second pixel electrode 684. The third pixel PX3_b may include a third pixel electrode 685. The fourth pixel PX4_b may include a fourth pixel electrode 686. For example, each of the first to fourth pixels PX1_b, PX2_b, PX3_b and PX4_b may include only a single pixel electrode, e.g., the first to fourth pixel electrodes 683, 684, 685 and 686.

In the first pixel PX1_b, a first color filter 431 may be disposed such that it overlaps the first pixel electrode 683. In the second pixel PX2_b, a second color filter may be disposed such that it overlaps the second pixel electrode 684. In the third and fourth pixels PX3_b and PX4_b, a third color filter may be disposed such that it overlaps the third pixel electrode 685 and the fourth pixel electrode 686.

The first color filter 431 may be a red color filter that allows a light passing therethrough providing a red color. The second color filter may be a green color filter that allows a light passing therethrough to provide a green color. The third color filter may be a blue color filter that allows a light passing therethrough to provide a blue color.

However, exemplary embodiments of the present inventive concept are not limited thereto. For example, the first color filter 431 may be a green color filter, and the second color filter may be a red color filter. The third color filter may be a blue color filter that is disposed across the third pixel PX3_b and the fourth pixel PX4_b.

While the first pixel PX1_b produces a red color and the second pixel PX2_b produces a green color, both of the third pixel PX3_b and the fourth pixel PX4_b produce a blue color. Therefore, a ratio of an area of the first pixel PX1_b, an area of the second pixel PX2_b, and a sum of an area of the third pixel PX3_b and an area the fourth pixel PX4_b may be adjusted. Accordingly, in the pixel unit PXU_b, the area occupied by the first pixel PX1_b, the area occupied by the second pixel PX2_b, and the sum of the area occupied by the third pixel PX3_b and the area occupied by the fourth pixel PX4_b may be equal to one another.

Even though the third pixel PX3_b and the fourth pixel PX4_b both produce blue color, one of the third pixel PX3_b and the fourth pixel PX4_b may produce blue color of relatively bright grayscale and the other pixel may produce blue color of relative dark grayscale.

For example, the blue color produced by the third pixel PX3_b may be brighter than that of the fourth pixel PX4_b. In this case, the voltage applied to the third pixel electrode may be larger than the voltage applied to the fourth pixel electrode.

Further, the first pixel PX1_b produces red color, the second pixel PX2_b produces green color, the third pixel PX_b produces relatively bright blue color, and the fourth pixel PX4_b produces relatively dark blue color, such that the visibility may be increased.

Since the blue color may be produced at two grayscales, a reduction in transmittance may be reduced to a lesser extent than compared to when red color and green color are produced at two grayscales each.

In addition, since only the blue color is produced at two grayscales, the visibility may be increased when skin color is reproduced.

Further, for the pixel unit PXU shown in FIGS. 2 and 4, the area occupied by the second sub-pixel electrode 286 may be equal to or larger than that of the first sub-pixel electrode 285, to increase visibility. In addition, for the pixel unit PXU_b according to an exemplary embodiment of the present inventive concept, there is no particular limit on the areas occupied by the third pixel electrode and the fourth pixel electrode. This is because the third pixel PX3_b and the fourth pixel PX4_b of the pixel unit PXU_b, according to an exemplary embodiment of the present inventive concept shown in FIG. 9, may be controlled by different data lines 667, respectively. However, the first sub-pixel electrode 285 and the second sub-pixel electrode 286 shown in FIGS. 2 and 4 may be controlled by the single data line 267.

For example, the voltage applied to the third pixel PX3_b and the voltage applied to the fourth pixel PX4_b may be set by the data driver 120. Accordingly, the areas occupied by the third pixel electrode 685 may be substantially equal to the area occupied by the fourth pixel electrode 686, and thus the area occupied by the third pixel PX3_b may be equal to the area occupied by the fourth pixel PX4_b.

Figure 11:
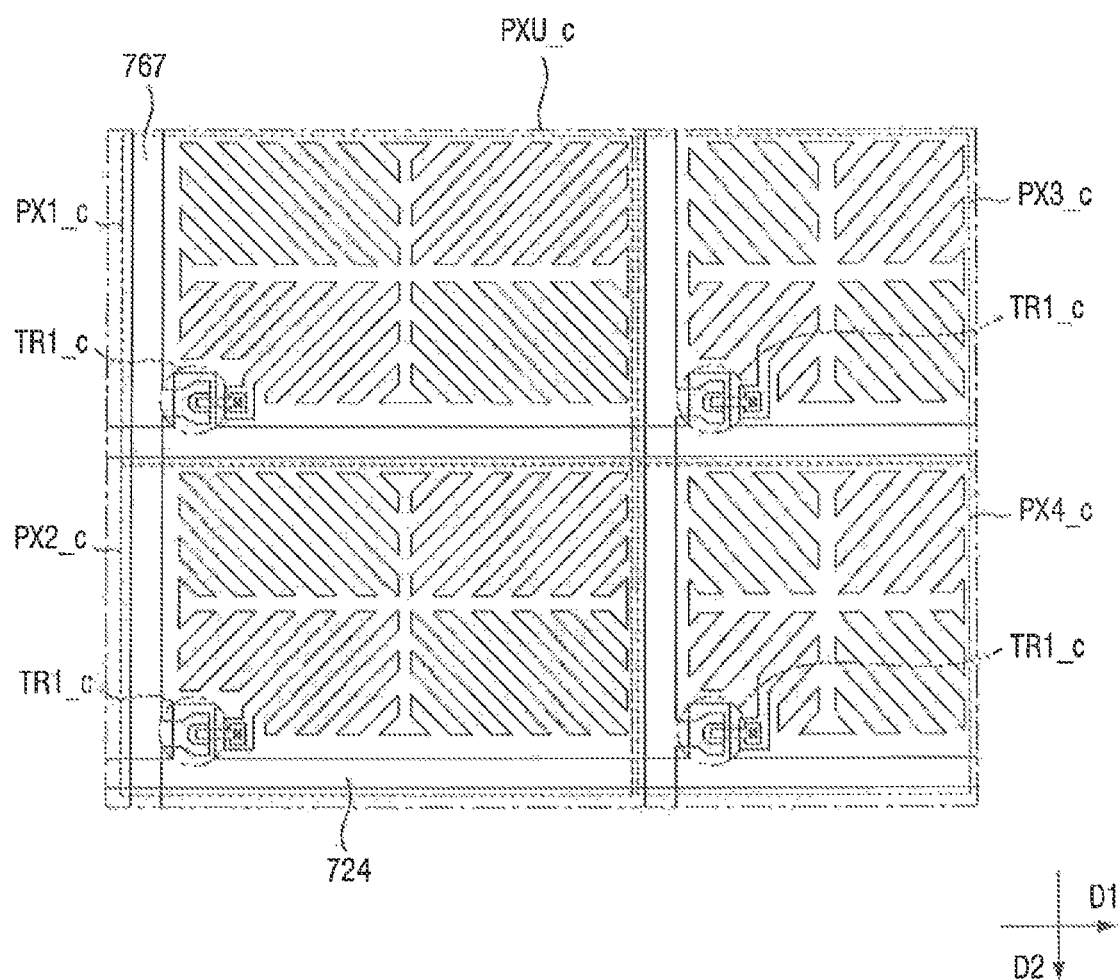
FIG. 11 is a layout diagram of a single pixel disposed in a display panel according to an exemplary embodiment of the present inventive concept.

FIG. 11 is a layout diagram of a single pixel disposed in a display panel according to an exemplary embodiment of the present inventive concept.

An exemplary embodiment of the present inventive will be described while focusing on elements that are different from those of an exemplary embodiment of the present inventive concept shown in FIG. 9.

Unlike the pixel unit PXU_b shown in FIG. 9, a pixel unit PXU_c, according to an exemplary embodiment of the present inventive concept, shown in FIG. 11 includes first to fourth pixels PX1_c, PX2_c, PX3_c and PX4_c that may be controlled by two data lines 767 extended in the second direction D2, and two gate lines 724 extended in the first direction D1. In this case, the third pixel PX3_c and the fourth pixel PX4_c, which are for producing blue color, may be connected to different gate lines 724.

Accordingly, the first pixel PX1_c for producing red color may be disposed on the upper left side. The second pixel PX2_c for producing green color may be disposed on the lower left side. The third pixel PX3_c for producing relatively bright blue color may be disposed on the upper right side. The fourth pixel PX4_c for producing relatively dark blue color may be disposed on the lower right side.

For example, compared to an exemplary embodiment of the present inventive concept shown in FIG. 9, the directions in which the gate lines 724 and the data lines 767 are extended may be changed, and accordingly the arrangement of the first to fourth pixels PX1_c, PX2_c, PX3_c and PX4_c may be changed.

With the arrangement shown in FIG. 11, the effects of increasing the visibility overall, and increasing the transmittance and increasing the visibility when skin color is reproduced may be achieved as in an exemplary embodiment of the present inventive concept shown in FIGS. 9 and 10.

The effects of the present inventive concept are not limited by the foregoing, and other various effects are anticipated herein.

While the present inventive concept has been shown and described with reference to the exemplary embodiments thereof, it will be apparent to those of ordinary skill in the art that various changes in form and detail may be made thereto without departing from the spirit and scope of the present inventive concept.

What is claimed is:
1. A liquid-crystal display (LCD) device comprising:
a first substrate;
first and second gate lines disposed on the first substrate to deliver gate signal;
first and second data lines disposed on the first substrate to deliver a data signal;
a plurality of pixel units disposed on the first substrate;
a color filter layer overlapping the plurality of pixel units and comprising first to third color filters;
a second substrate facing the first substrate; and
a liquid-crystal layer interposed between the first substrate and the second substrate,
wherein each of the pixel units of the plurality of the pixel units comprises first to fourth pixels,
wherein the first pixel comprises a first pixel electrode, the second pixel comprises a second pixel electrode, the third pixel comprises a third pixel electrode, and the fourth pixel comprises a fourth pixel electrode,
wherein the first color filter overlaps the first pixel electrode, the second color filter overlaps the second pixel electrode, and the third color filter overlaps both of the third and fourth pixel electrodes,
wherein, in each of the pixel units, an area occupied by the first pixel, an area occupied by the second pixel, a sum of an area occupied by the third pixel, and an area occupied by the fourth pixel are all substantially equal to one another, and
wherein:
the first pixel and the second pixel are connected to the first gate line,
the third pixel and the fourth pixel are connected to the second gate line,
the first pixel and the third pixel are connected to the first data line, and
the second pixel and the fourth pixel are connected to the second data line.

2. The LCD device of claim 1, wherein the first color filter is a red color filter,
the second color filter is a green color filter, and
the third color filter is a blue color filter.

3. The LCD device of claim 1, wherein each of the first to fourth pixels is disposed in a rectangular area, of a pixel unit of the plurality of the pixel units, having two rows and two columns, and
wherein each of the pixel units has a rectangular shape.

4. The LCD of claim 3, wherein the first pixel is disposed in the first row of the first column of the pixel unit,
the second pixel is disposed in the first row of the second column of the pixel unit,
the third pixel is disposed in the second row of the first column of the pixel unit, and
the fourth pixel is disposed in the second row of the second column of the pixel unit.

5. A liquid-crystal display (LCD) device comprising:
a first substrate;
a plurality of pixel units disposed on the first substrate;
a color filter layer overlapping the plurality of pixel units and comprising first to third color filters;
a second substrate facing the first substrate; and
a liquid-crystal layer interposed between the first substrate and the second substrate,
wherein each of the pixel units of the plurality of the pixel units comprises first to fourth pixels,
wherein the first pixel comprises a first pixel electrode, the second pixel comprises a second pixel electrode, the third pixel comprises a third pixel electrode, and the fourth pixel comprises a fourth pixel electrode,
wherein the first color filter overlaps the first pixel electrode, the second color filter overlaps the second pixel electrode, and the third color filter overlans both of the third and fourth pixel electrodes,
wherein a voltage applied to the third pixel electrode is different from a voltage applied to the fourth pixel electrode,
wherein, in each of the pixel units, an area occupied by the first pixel, an area occupied by the second pixel, and a sum of an area occupied by the third pixel; and an area occupied by the fourth pixel are all substantially equal to one another,
wherein each of the first to fourth pixels is disposed in a rectangular area, of a pixel unit of the plurality of the pixel units, having two rows and two columns,
wherein each of the pixel units has a rectangular shape,
wherein the first pixel is disposed in the first row of the first column of the pixel unit,
the second pixel is disposed in the second row of the first column of the pixel unit,
the third pixel is disposed in the first row of the second column of the pixel unit, and
the fourth pixel is disposed in the second row of the second column of the pixel unit, and wherein the LCD device further comprises:
first and second gate lines disposed on the first substrate to deliver a gate signal; and
first and second data lines disposed on the first substrate to deliver a data signal, wherein;
the first pixel and the third pixel are connected to the first gate line,
the second pixel and the fourth pixel are connected to the second gate line,
the first pixel and the second pixel are connected to the first data line, and
the third pixel and the fourth pixel are connected to the second data line.

6. The LCD device of claim 1, wherein the area occupied by the third pixel is substantially equal to the area occupied by the fourth pixel.

7. The LCD device of claim 1, wherein the third pixel electrode is configured to receive a first voltage, and
wherein the fourth pixel electrode is configured to receive a second voltage which is different from the first voltage.

* * * * *